US009803328B2

(12) United States Patent
Copple et al.

(10) Patent No.: US 9,803,328 B2
(45) Date of Patent: Oct. 31, 2017

(54) FLOATABLE SUPPORT STRUCTURE FOR AN OFFSHORE WIND TURBINE OR OTHER DEVICE

(71) Applicants: Robert W. Copple, Mill Valley, CA (US); Cuneyt C. Capanoglu, Millbrae, CA (US)

(72) Inventors: Robert W. Copple, Mill Valley, CA (US); Cuneyt C. Capanoglu, Millbrae, CA (US)

( * ) Notice: Subject to any disclaimer, the term of this patent is extended or adjusted under 35 U.S.C. 154(b) by 0 days.

(21) Appl. No.: 15/499,861

(22) Filed: Apr. 27, 2017

(65) Prior Publication Data

US 2017/0241094 A1    Aug. 24, 2017

Related U.S. Application Data

(63) Continuation of application No. 15/244,801, filed on Aug. 23, 2016, now Pat. No. 9,663,915, which is a
(Continued)

(51) Int. Cl.
*B63B 35/44*    (2006.01)
*E02B 17/00*    (2006.01)
(Continued)

(52) U.S. Cl.
CPC .............. *E02B 17/00* (2013.01); *B63B 35/44* (2013.01); *F03D 13/25* (2016.05);
(Continued)

(58) Field of Classification Search
CPC ................................ B63B 35/44; E02D 27/52
See application file for complete search history.

(56) References Cited

U.S. PATENT DOCUMENTS 6,851,894 B1    2/2005    Perret et al.
8,893,638 B2    11/2014   Thieffry
(Continued)

FOREIGN PATENT DOCUMENTS

WO    2009/068712 A1    6/2009

OTHER PUBLICATIONS

International Search Report and Written Opinion dated Jul. 27, 2015 in Int'l Patent Application No. PCT/US2015/026893, 12 pages.
(Continued)

*Primary Examiner* — Stephen Avila
(74) *Attorney, Agent, or Firm* — Kilpatrick Townsend & Stockton LLP

(57) ABSTRACT

An apparatus for supporting an additional structure near a surface of a body of water, and a system which includes the apparatus and further includes the structure attached to the apparatus. The apparatus and the system are each configured to assume a rest position and orientation when the apparatus or system is floating at the surface and when the body of water is substantially still, where the rest orientation defines a vertical direction extending from the surface to a keel at a lowermost position of the apparatus. The apparatus includes a support member, which, in use, is attached to the additional structure; and buoyant units. Each buoyant unit is attached to the support member at or near the keel and extends from the keel in a longitudinal direction of the buoyant unit, which longitudinal direction defines an angle of approximately 35°-65° with respect to the vertical direction.

32 Claims, 9 Drawing Sheets

Related U.S. Application Data continuation-in-part of application No. 14/692,715, filed on Apr. 21, 2015, now abandoned.

(60) Provisional application No. 61/982,258, filed on Apr. 21, 2014.

(51) Int. Cl.
*F03D 13/25* (2016.01)
*B63B 1/12* (2006.01)

(52) U.S. Cl.
CPC ... *B63B 2001/128* (2013.01); *B63B 2035/446* (2013.01); *E02B 2017/0091* (2013.01); *F05B 2240/93* (2013.01)

(56) References Cited

U.S. PATENT DOCUMENTS

| | | |
|---|---|---|
| 2006/0165493 A1 | 7/2006 | Nim |
| 2012/0294681 A1 | 11/2012 | Wong et al. |
| 2012/0318186 A1 | 12/2012 | Thieffry |
| 2013/0276691 A1 | 10/2013 | Thieffry et al. |
| 2016/0362861 A1 | 12/2016 | Copple |

OTHER PUBLICATIONS

Non-Final Office Action received in U.S. Appl. No. 15/244,801, dated Sep. 30, 2016, 5 pages.
Notice of Allowance received in U.S. Appl. No. 15/244,801, dated Feb. 1, 2017, 5 pages.

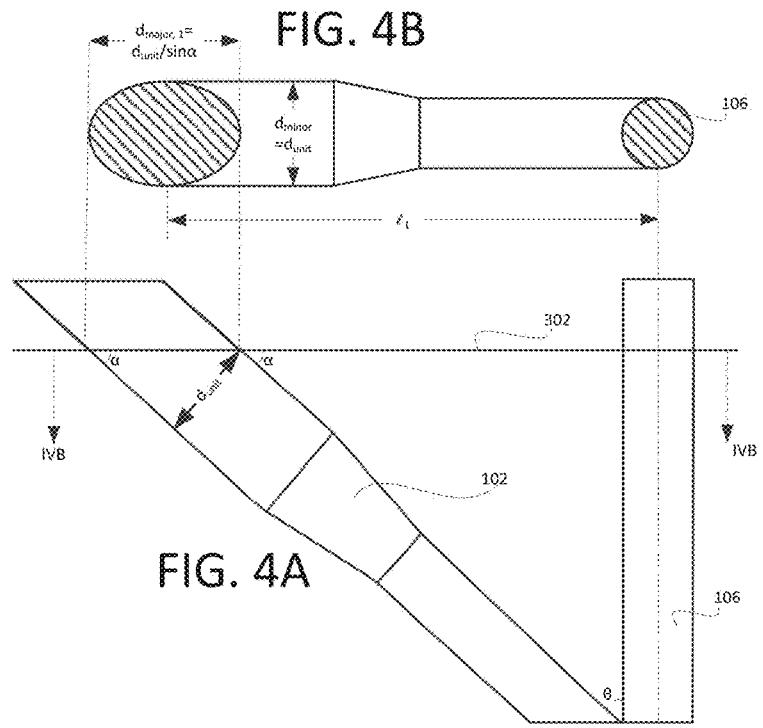
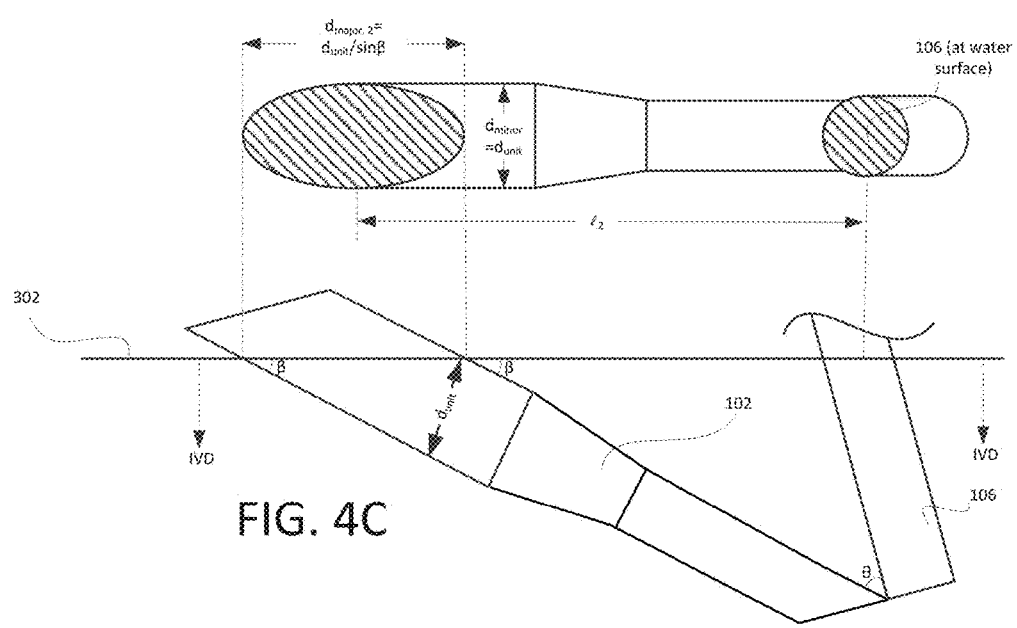

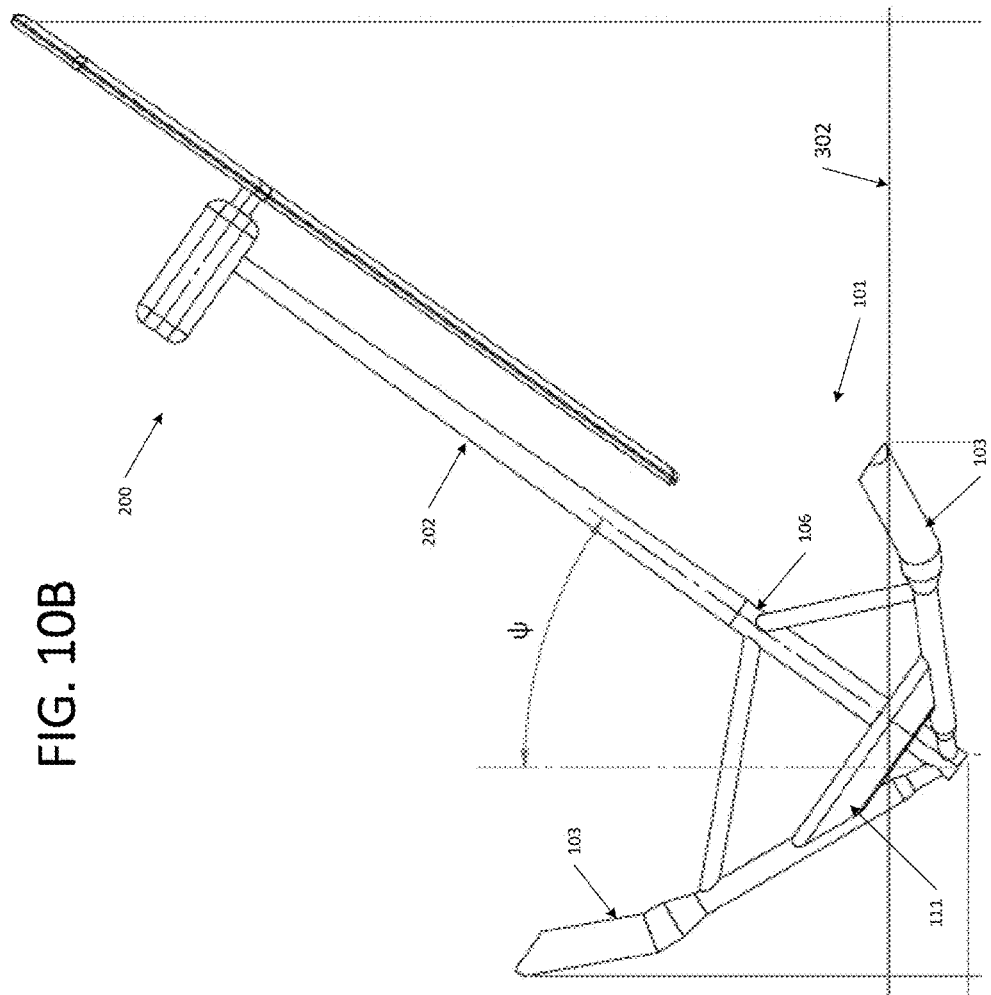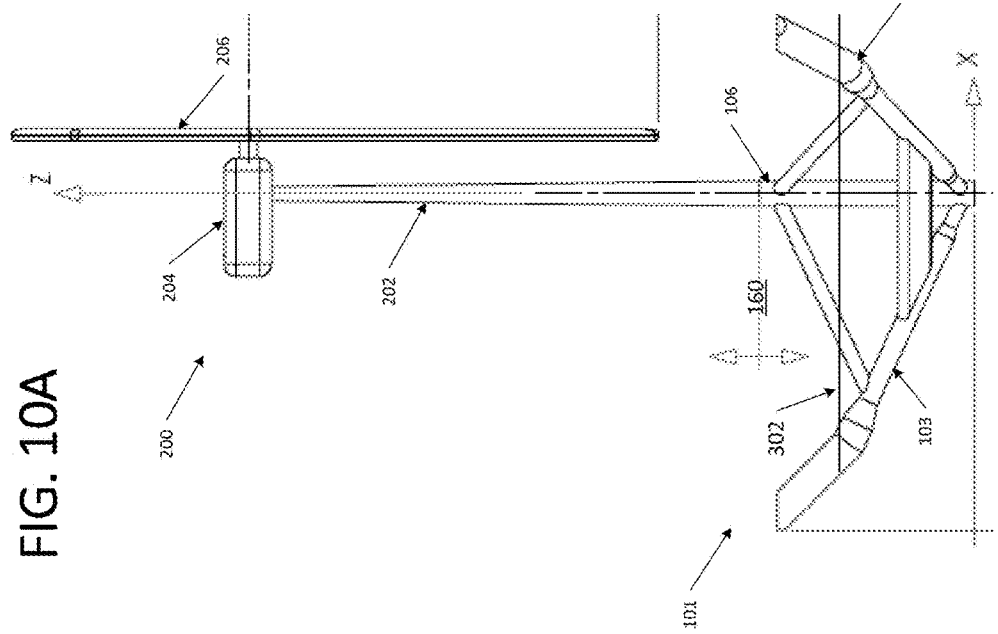

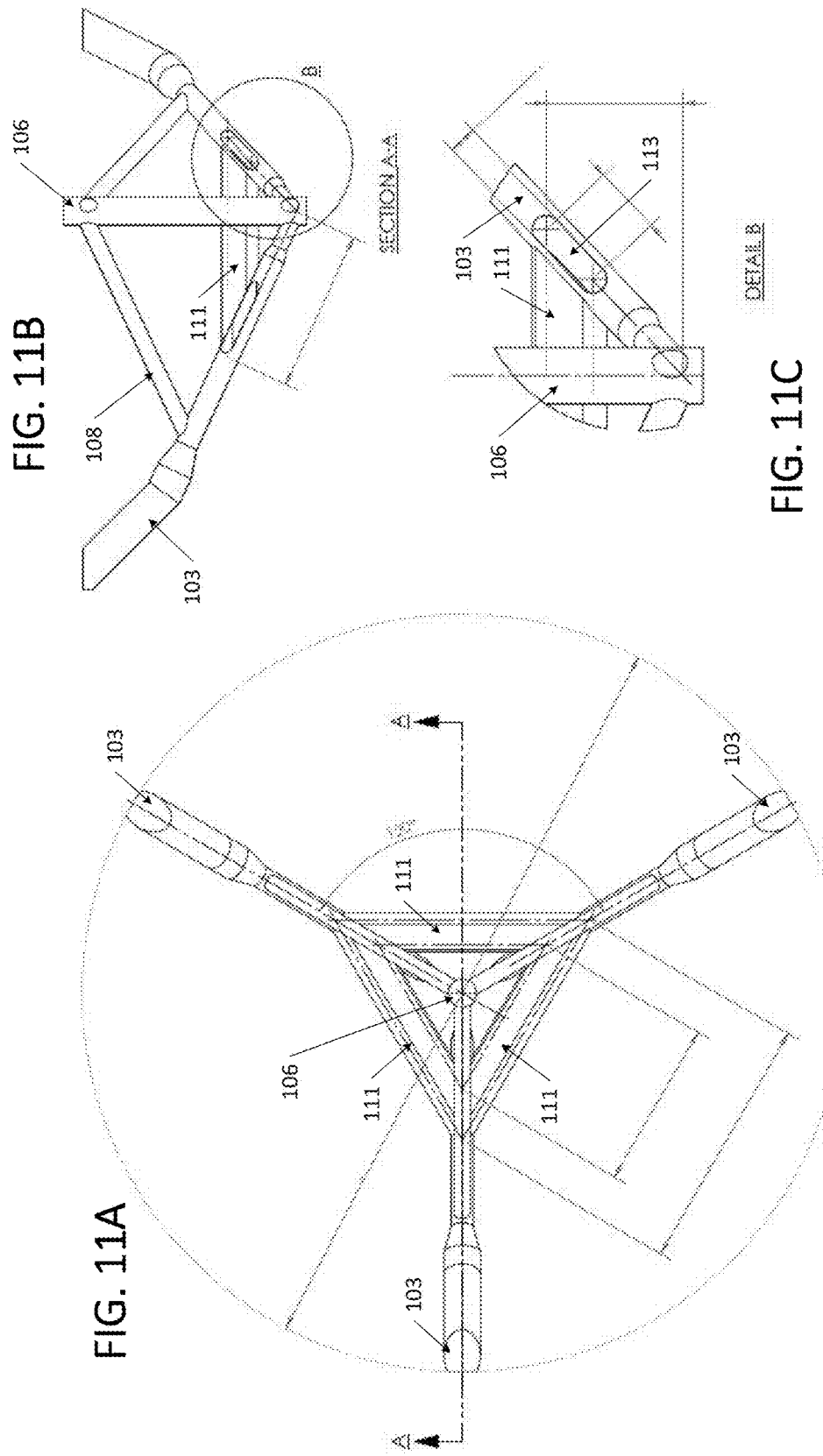

FLOATABLE SUPPORT STRUCTURE FOR AN OFFSHORE WIND TURBINE OR OTHER DEVICE

CROSS-REFERENCE TO RELATED APPLICATION

This application is a continuation of U.S. application Ser. No. 15/244,801 (currently allowed), filed Aug. 23, 2016, which is a continuation-in-part of U.S. application Ser. No. 14/692,715, filed Apr. 21, 2015, which claims the benefit of US Provisional Application Ser. No. 61/982,258, filed Apr. 21, 2014, the disclosures of which are hereby incorporated by reference.

TECHNICAL FIELD

The present invention relates to a floatable support structure configured to be anchored to the sea floor and to support an additional device such as an offshore wind turbine.

BACKGROUND OF THE INVENTION

A support structure for an offshore wind turbine must be stable and safe. Wind turbines can operate satisfactorily when motions due to wind current and waves are relatively small. However large motions of surge, sway, pitch, roll, yaw, and heave will result in inefficient operation or shutdown. Therefore, the support structure must have relatively small motions. The support structure motions are affected by the force of wind on the turbine blades, nacelle, and tower, by the wave and current forces on the submerged structure, by the period of the waves, by the period of the rotating turbine blades, and by the natural period of the entire structure, i.e. the time it takes to complete one cycle of motion when subjected to an excitation force. This period depends on the mass of the structure including the added mass of surrounding water, the stiffness of the structure itself (e.g. tower flexing and blade flexing), and the stiffness of the anchoring system of the structure.

If the period of the support structure is synchronous with the period of the waves, the wave forces will be amplified, leading to disruption of operations and/or structural failure. Therefore it is desirable to ensure that the natural period of the support structure differs substantially from the wave periods for all reasonably expected waves.

Vortex Induced Motions (VIMs) are another factor affecting the motions of a floating wind turbine support structure. VIMs are defined as motions caused by vortexes that form from current moving past a structure.

SUMMARY

The disclosure relates to an apparatus for supporting an additional structure near a surface of a body of water. Also disclosed is a system which includes the apparatus and further includes the structure attached to the apparatus. The apparatus and the system are each configured to assume a rest position and orientation when the apparatus or system is floating at the surface and when the body of water is substantially still, where the rest orientation defines a vertical direction extending from the surface to a keel at a lowermost position of the apparatus. The apparatus includes a support member, which, in use, is attached to the additional structure; and buoyant units. Each buoyant unit is attached to the support member at or near the keel and extends from the keel in a longitudinal direction of the buoyant unit, which longitudinal direction defines an angle of approximately 35°-65° with respect to the vertical direction.

Each of the buoyant units may have a certain cross-sectional area at a first position along the longitudinal direction, and a different cross-sectional area at a second position along the longitudinal direction. For example, each of the buoyant units may have a certain cross-sectional area at a first portion of the buoyant unit that is distal from the keel, and a smaller cross-sectional area at a second portion of the buoyant unit that is proximal to the keel. There may be a transitional portion of the buoyant unit between the first portion and the second portion, such as a tapered transitional portion.

Alternatively, each of the buoyant units may have a cross-sectional area that is substantially constant along the longitudinal direction.

The buoyant units may be symmetrically disposed around the vertical direction.

The buoyant units may be three buoyant units, four buoyant units, or more than four buoyant units.

At least a portion of each buoyant unit that is distal from the keel may include a buoyant material, whose density is lower than the density of the body of water. At least a portion of each buoyant unit that is proximal to the keel may include a ballast material, whose density is equal to or higher than the density of the body of water.

The apparatus or system may further include at least one anchor line or tether, configured to attach the apparatus to a substantially stationary position within the body of water. The anchor line or tether may include one or more catenary anchor lines, each attached to one of the buoyant units. The anchor line or tether may include one or more tendons, each attached to one of the buoyant units, and configured to assume a substantially vertical orientation to anchor the apparatus or system to the floor of the body of water.

The apparatus or system may further include a heave plate at the keel.

The floatable structure may include a wind turbine and associated tower. The support member may be attached to the tower.

BRIEF DESCRIPTION OF THE DRAWINGS

Exemplary embodiments will be described in more detail with reference to the accompanying drawings, in which:

FIGS. 4A-4D are schematic illustrations showing the water plane area of an exemplary buoyant unit and its distance from the centroid of the structure, where:

FIG. 4A is a side view of a buoyant unit when the support structure is in its upright position;

FIG. 4B is a cross-sectional view showing the water plane area of the buoyant unit of FIG. 4A and the distance of the water plane area from the centroid of the structure;

FIG. 4C is a side view of the buoyant unit when the support structure is tilted significantly; and FIG. 4D is a cross-sectional view showing the water plane area of the buoyant unit in the configuration of FIG. 4C and the distance of the water plane area from the centroid of the structure.

FIG. 10A is side elevation view of the support structure with a tower and turbine attached of FIG. 7, according to the present disclosure.

FIG. 10B is side view of the support structure with a tower and turbine attached of FIG. 7 in a tilted or transport position, according to the present disclosure.

FIG. 11A is a plan view of the support structure as shown in FIG. 9.

FIG. 11B is a cross-sectional view of the support structure as shown in FIG. 11A along the line A-A.

FIG. 11C is a detail view of a section of the support structure as shown in FIG. 11B as region B.

DETAILED DESCRIPTION OF THE PREFERRED EMBODIMENTS

Exemplary embodiments described herein provide a floatable support structure configured to be anchored to the sea floor and to support an offshore wind turbine or other device. Some embodiments are considered particularly useful for deep waters, such as in water depths greater than about 40 meters, and some embodiments can be used in depths of over one thousand meters.

Figure 1:
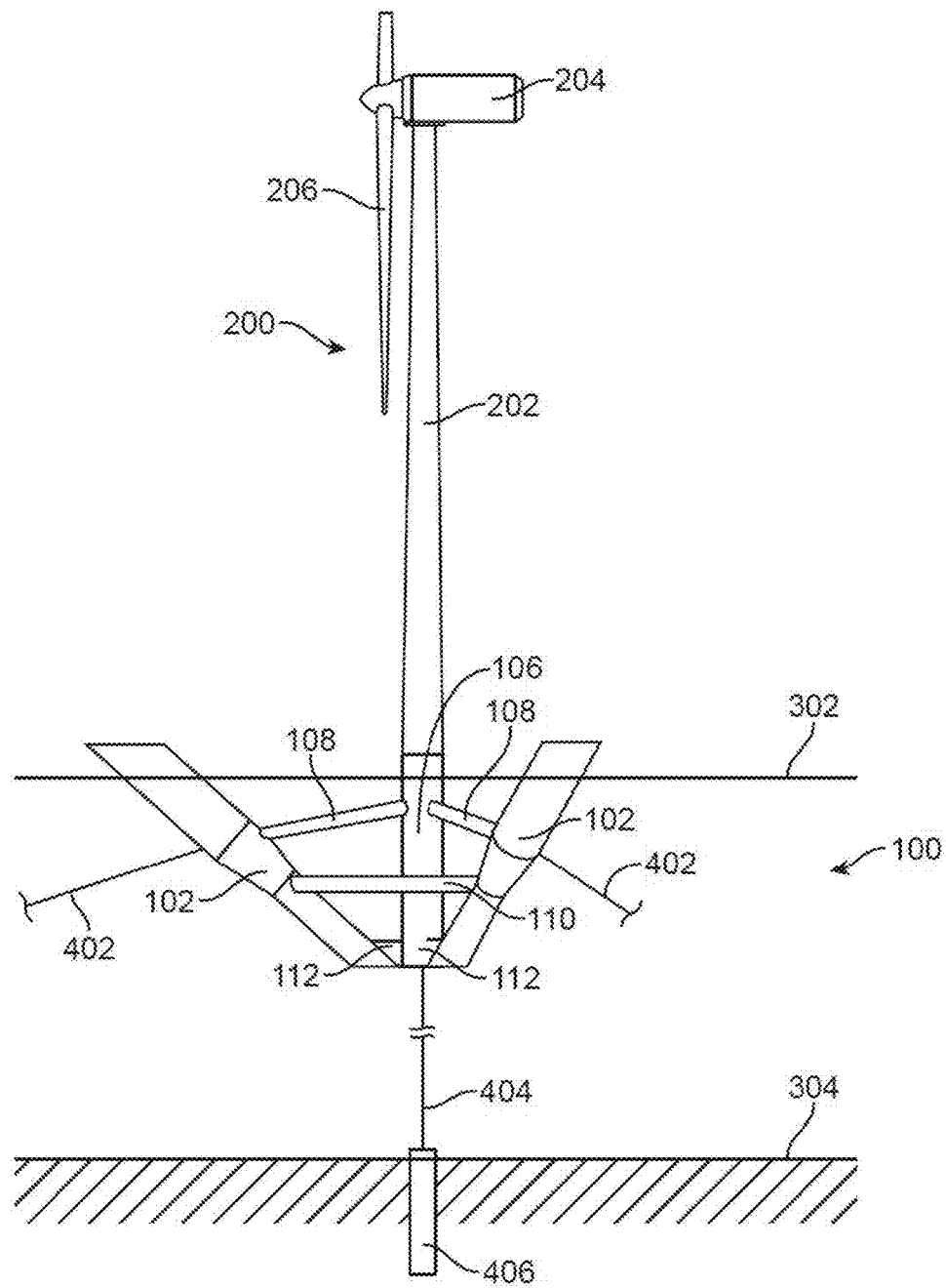
FIG. 1 is an elevation view of an exemplary floatable support structure with a tower and turbine attached, and anchored to the sea floor with a vertical tendon at the keel and taut catenary anchors.

Turning to FIG. 1, a floatable support structure 100 is shown supporting a wind turbine 200 and floating the wind turbine 200 on a water surface 302. The floatable structure 100 is attached to the sea floor 304 by catenary anchor lines 402 or vertical tendons 404 or, as illustrated, by both catenary anchor lines 402 and a vertical tendon 404.

Figure 2A:
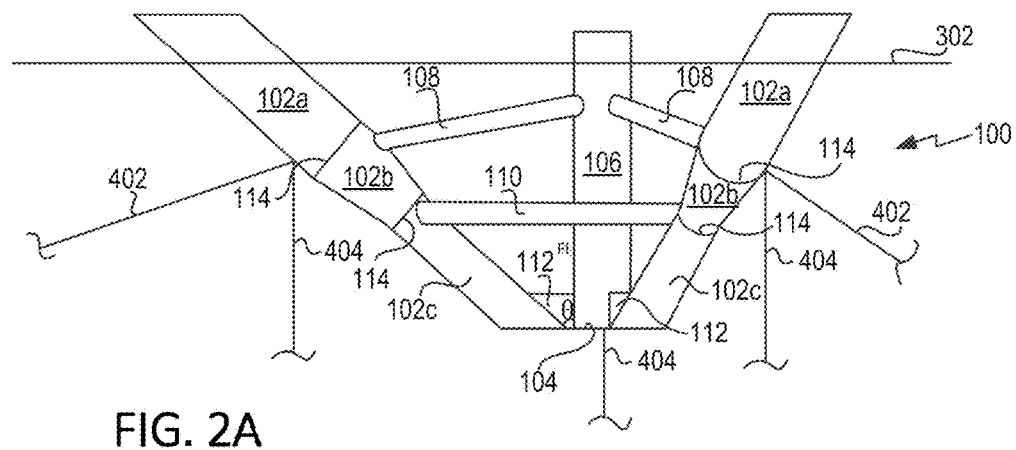
FIG. 2A is an enlarged elevation view of the support structure of FIG. 1 without the tower and turbine attached, and with additional vertical tendons.
Figure 2B:
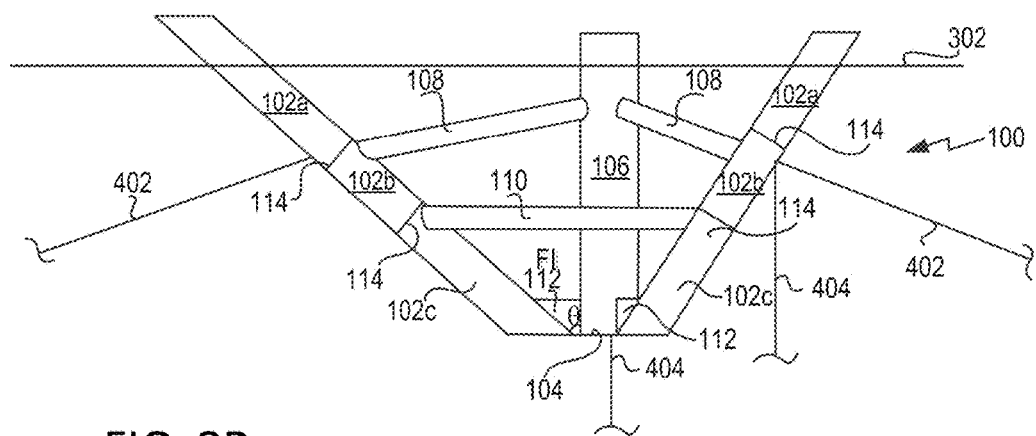
FIG. 2B is a view similar to FIG. 2A, showing an alternative embodiment of the shape of buoyant units.
Figure 3:
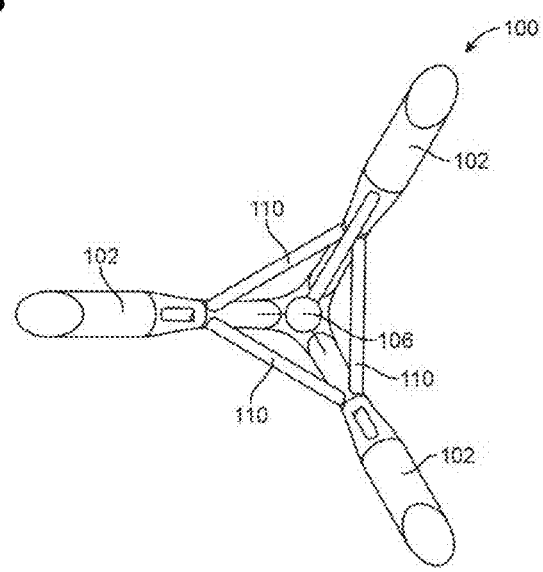
FIG. 3 is a plan view of the support structure of FIGS. 1, 2A, and 2B without the tower and turbine attached.

With further reference to FIGS. 2A, 2B, and 3, the structure 100 includes buoyant units 102 which meet at the keel 104 of the structure and extend slopingly upward from the keel 104. (As used herein, the keel 104 should be understood to be the bottommost point or area of the structure 100 when the structure 100 is in its upright position, which position is seen in FIGS. 1, 2A, and 2B. In other words, the horizontal line at the bottom of the structure 100 near where the tendon 404 attaches to the structure 100 in FIGS. 1, 2A, and 2B is the keel.) The structure 100 also includes a generally central support member 106 which attaches to the buoyant units 102 at the keel 104 and extends generally vertically therefrom. The support member 106 is configured to attach to and to support a tower 202 of the turbine 200. The buoyant units 102 and the support member 106 are connected to one another by various braces 108, 110 and connecting members 112.

The buoyant units 102 are partly submerged in use, i.e. partly below the water surface 302, as shown. The illustrated embodiments include three such buoyant units 102, which slope outward from at or near the keel 104 to above the water surface 302. In some presently preferred embodiments, three or more buoyant units 102 are provided. Each buoyant unit 102 is a generally tubular member whose diameter may vary along its length, as will be discussed in detail later. Each buoyant unit 102 intersects the support member 106 at an angle θ of approximately 35°-65°. In other words, the longitudinal direction of each buoyant unit 102 is about 35°-65° from the longitudinal direction of the support member 106, which is vertical when the structure is in its upright position, i.e. not being rocked by waves or wind.

In the embodiment illustrated in FIG. 2A, each buoyant unit 102 is a generally tubular member whose diameter varies along its length to provide a larger cross-sectional area at the top portion of the buoyant unit 102 than at the bottom. In the alternative embodiment illustrated in FIG. 2B, the diameter is substantially constant along the length. Each buoyant unit 102 includes several compartments 102a, 102b, 102c, separated by water-tight bulkheads 114, along its length. There may also be smaller sub-compartments (not illustrated) within these compartments 102a, 102b, 102c. The upper compartments 102a may contain buoyant material, and the lower compartments 102c may contain ballast material. The diameter and length of the upper compartment 102a of each buoyant unit can be selected to achieve the required buoyant force and water plane area and resulting moment of inertia of the structure 100's cross section at the waterline 302. An intermediate, or "transition" section 102b connects the upper part 102a of each buoyant unit 102 to the lower part 102c of the buoyant unit 102. In the embodiment illustrated in FIG. 2A, the lower part 102c has a smaller cross-sectional area than the upper part 102a. Depending on requirements for stability, a large portion of each buoyant unit 102 will be filled with ballast. Therefore ballast requirements as well as buoyancy requirements will dictate the length and cross-sectional area of each part 102a, 102b, 102c of each buoyant unit 102.

In a presently preferred embodiment, both the buoyant units 102 and the support member 106 are steel tubular members, which may include ring stiffeners and/or longitudinal stiffeners on the interior to hold the round shape and to resist hydrostatic pressure. In a presently particularly preferred embodiment, the units 102 and member 106 include ring stiffeners, and may additionally include longitudinal stiffeners.

The tower 202 is supported by the support member 106. The tower 202 extends from the support member 106 to high above the water surface 302 to support the wind turbine 200. In more detail, the tower 202 supports the nacelle 204 which supports the turbine rotor blades 206, and which contains the controls, the generator, and other required components.

The buoyant units 102 are connected to the support member 106 by braces 108. The buoyant units 102 are connected to one another by braces 110. Near the keel 104, the buoyant units 102 are further connected to the support member 106 by connecting members 112.

The support structure 100 is mounted to the sea floor 304 by catenary anchor lines 402, which may include, for example, chain and/or wire rope, and/or polyester.

The support structure 100 may additionally or alternatively be attached to the sea floor 304 by a vertical tether such as a tendon or tendons 404. In some embodiments, the tether or tethers may be wire ropes, chains, polyester ropes, or steel or metal tubes. By selecting an appropriate length, modulus of elasticity, and/or cross-sectional area of the tendon or tendons (in addition to further design considerations which will be discussed later with reference to FIGS. 4A-4D), the natural period of the structure 100 in heave, surge, sway, pitch, roll, and yaw can be made not to coincide with the wave period of any waves that can be expected in the particular area at which the support structure 100 is installed. As is further seen in FIGS. 2A and 2B, the tendon or tendons 404 can be attached to the structure 100 at or near the keel 104 and/or at one or more of the buoyant units 102. In a presently preferred embodiment, one tendon 404 is attached at each of the buoyant units 102. In practice, it is unlikely that three anchor lines 402 would be used in conjunction with three tendons 404 at the buoyant units 102 and an additional tendon 404 at the keel 104, as is illustrated. These illustrations are provided for the sake of completeness, to illustrate many possible attachment locations of anchor lines and tendons.

The tendon or tendons 404 may be attached to the sea floor 304 via an anchor or anchors 406. Depending on the applied force from the tendon 404 and the sea floor conditions, each anchor may be a suction pile, a driven pile, a drilled and grouted pile, a gravity anchor, or any anchor with the capacity to transmit the tendon forces to the sea floor.

It will be appreciated that the support structure 100 can be fabricated, assembled, and launched at a quay, uprighted, then outfitted with the tower 202 and wind turbine 200 all at quay site. The assembled wind turbine 200 and support structure 100 can then be towed in upright position to its installation site and then be attached to previously installed anchors 406 or catenary anchor lines 402.

In the illustrated embodiments, the support structure 100 is shown supporting an offshore wind turbine 200 and associated tower 202. The structure 100 can also be used to support any other device, such as an electrical substation, or for oil and gas exploration and production.

In some unillustrated embodiments, the support structure 100 is used to support a platform for a support station rather than a turbine 200. Since these platforms are generally rectangular in plan view, the structure will typically have four buoyant units 102 rather than the three buoyant units 102 illustrated, each of which will attach to the platform at or near a corner thereof. In a presently preferred embodiment, the support member 106 extends through a blind hole or a through hole at the center of the platform to provide further support.

Turning now to FIGS. 4A-4D, the stability of the exemplary structure 100 will now be discussed. It will be appreciated that the stability of the structure 100 is proportional to I/V, where I is the moment of inertia of the water plane area (for the hydrodynamic definition of moment of inertia, as opposed to the mass moment of inertia), and V is the volume of water displaced by the structure 100. For the sake of simplicity, FIGS. 4A-4D illustrate the stability of a single one of the buoyant units 102. It will further be appreciated that the moment of inertia I is proportional to $Al^2$, where A is the water plane area of the buoyant unit 102, in other words, the cross-sectional area of the buoyant unit 102 that is presented to the surface of the water (i.e. the cross-section taken vertically, as opposed to along the longitudinal axis of the buoyant unit 102), and l is the horizontal distance from the centroid of the water plane area of the buoyant unit 102 to the centroid of the water plane area of the entire structure 100.

Turning to FIG. 4A, one of the buoyant units 102 is shown along with the support member 106, when the structure 100 is upright, i.e. not being rocked by waves or wind. The additional buoyant units 102 are omitted from these FIGS. for simplicity. The orientation of the buoyant unit 102 in FIG. 4A is the same as that illustrated in FIGS. 1, 2A, and 2B. Assuming a circular cross-section for the upper part 102a of the buoyant unit 102 (taken along the longitudinal direction of the buoyant unit 102), the water plane area, i.e. the cross-section presented to the water surface 302, is elliptical, as seen in FIG. 4B. The minor diameter $d_{minor}$ of the ellipse is equal to the cross-sectional (along the longitudinal axis) diameter of the unit 102, $d_{minor}=d_{unit}$. The major diameter $d_{major,\ 1}$ is the distance between where the left and right edges of the unit 102 intersect the waterline 302 in FIG. 4A. Elementary trigonometry tells us that this distance $d_{major,\ 1}=d_{unit}/\sin\alpha$, where $\alpha$ is the angle at which the unit 102 intersects the water line 302, i.e. $\alpha=90°-\theta$. The horizontal distance $l_1$ from the center of the ellipse to the centroid of the structure 100, which in this case is the center of the water plane area of the support unit 106, is also shown in FIG. 4B.

Turning now to FIG. 4C, the structure 100 is shown tilted dramatically to the left. Again, the water plane area of the buoyant unit 102 is elliptical, as seen in FIG. 4D. The minor diameter $d_{minor}$ is again equal to $d_{unit}$. However, $d_{major,\ 2}$ is now much larger. $d_{major,\ 2}=d_{unit}/\sin\beta$, where $\beta$ is the new angle at which the unit 102 intersects the water line 302. The horizontal distance $l_2$ from the centroid of the water plane area of the buoyant unit 102 to the centroid of the structure 100 is also larger than that of FIG. 4B, since the center of the water plane area of the buoyant unit 102 is farther to the left due to the larger major diameter $d_{major,\ 2}$. Note that in this case, the centroid of the water plane area of the entire structure 100 is no longer coincident with the centroid of the water plane area of the support member 106, but is shifted slightly to the left. However, in practice, $l_2 > l_2$. Thus, the contribution of each buoyant unit 102 to the moment of inertia I of the structure 100, which is proportional to $Al^2$, increases when the respective unit 102 tips, providing increased stability when the structure 100 is impacted by waves or wind.

As was mentioned in the background section, a floating support structure should be subjected to relatively small motions when affected by wind, waves, and current in the directions of surge, sway, pitch, roll, yaw, and heave. The natural period depends on, among other parameters, the mass of the structure. The sloping buoyant units 102 of the above-described exemplary embodiments have a plan view that presents a large area exposed to water above and below the units. This results in a large added mass when considering heave, i.e. vertical motions, of the floatable structure.

Figure 5:
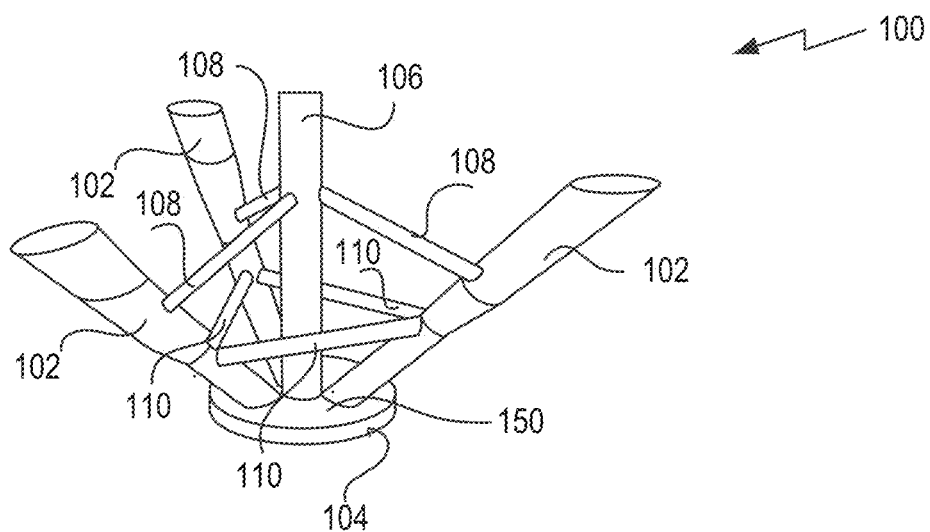
FIG. 5 is an elevation view, similar to that of FIG. 2, showing a further embodiment of the support structure.
Figure 6:
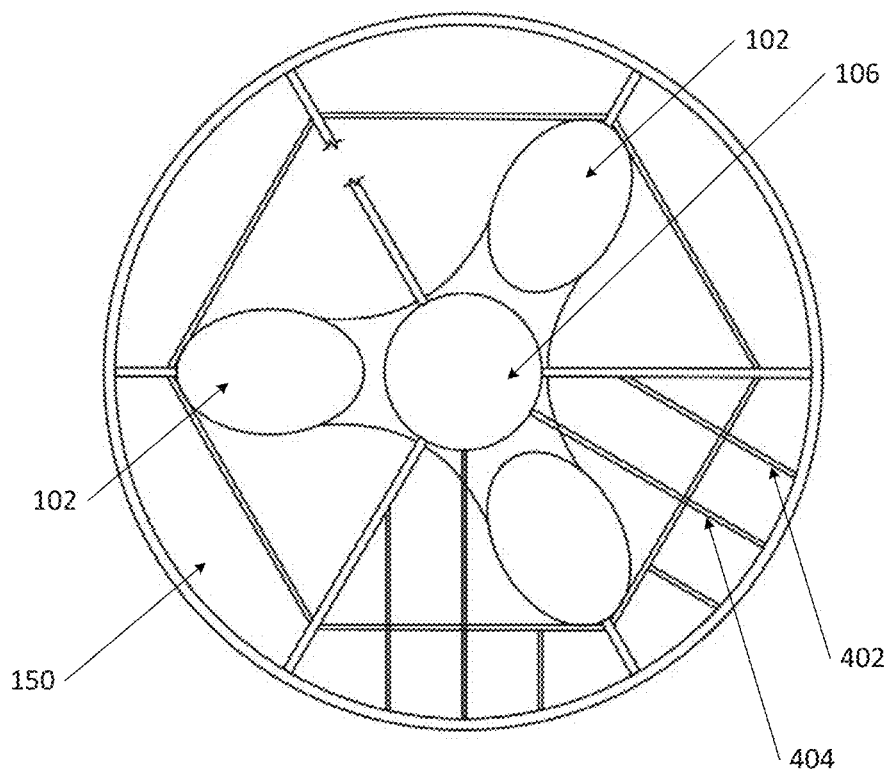
FIG. 6 is a plan view of the support structure of FIG. 5.

Turning now to FIGS. 5 and 6, in a further alternative embodiment, the structure 100 further includes a heave plate 150. It will be appreciated that, in embodiments with a vertical tendon or tendons 404, heave may not be much of a concern once the structure 100 is anchored to the sea floor 304 with the tendon or tendons 404, but heave can be a problem when the structure 100 is being towed from the quay to the installation site. Furthermore, in embodiments without a vertical tendon or tendons 404, such as embodiments in which the structure 100 is secured with catenary anchor lines 402 and not tendons 404, heave may be a concern even once the structure 100 is installed. Therefore, in some embodiments, the structure 100 further includes the heave plate 150, which minimizes heave while the structure 100 is being towed to the installation site and/or after installation.

A heave plate is typically generally plate-shaped; i.e. has two roughly parallel planar surfaces and is relatively thin in the direction perpendicular to these planes. The planar surfaces are typically disposed perpendicular to the direction of heave (i.e. roughly horizontal, parallel to the surface of the water 302 and to the sea floor 304) for increasing the effective mass of the structure to which they are attached (in this case the structure 100). A plate so attached affects the dynamic behavior of the structure 100 by increasing the effective mass and the viscous drag in the heave (vertical) direction. The heave plate 150 can be any relatively thin square, circular, rectangular, or any other shape of plate, and can either be solid or have holes punched in it.

In the illustrated embodiment, the heave plate 150 is circular, and is strengthened by hexagonal ridges 152. The shape of the plate 150 and ridges 152 are exemplary only and are in no way intended to be limiting. The heave plate 150 may have any shape in plan view and may have any number and configuration of ridges and/or holes on or in it.

To ensure that the period of the support structure differs substantially from all expected wave periods, the stiffness of the lines 402, 404 can be selected accordingly, for example, by selecting an appropriate material. Additionally or alternatively, the mass of the structure can be selected, for example, by adding or subtracting ballast.

Since VIMs are particularly pronounced on current moving past vertical, column-like elements, in presently preferred embodiments, the buoyant units are sloped. The result is that the formation of vortexes are disrupted and VIMs are diminished.

Figure 8:
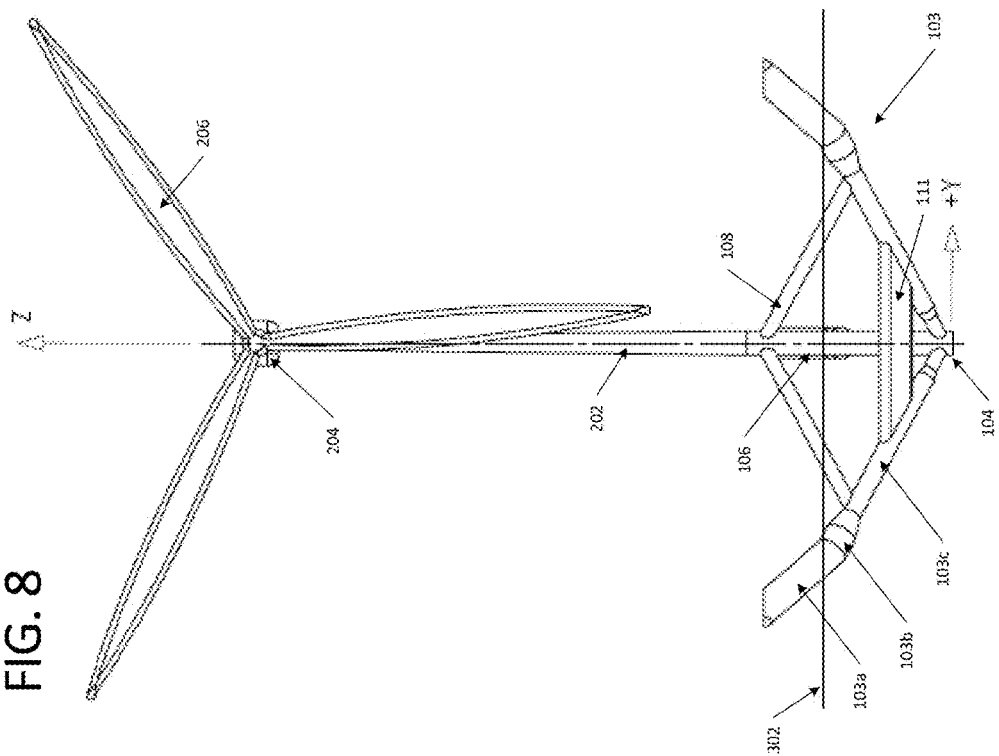
FIG. 8 is front elevation view of the support structure with a tower and turbine attached of FIG. 7, according to the present disclosure.
Figure 7:
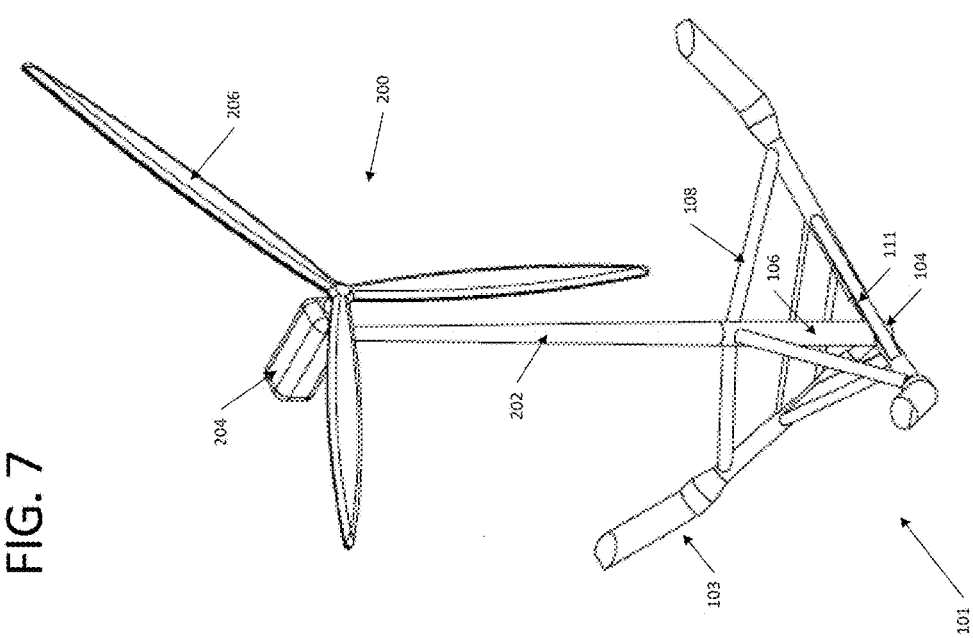
FIG. 7 is a perspective view of an exemplary floatable support structure with a tower and turbine attached, according to an alternative embodiment of the present disclosure.
Figure 9:
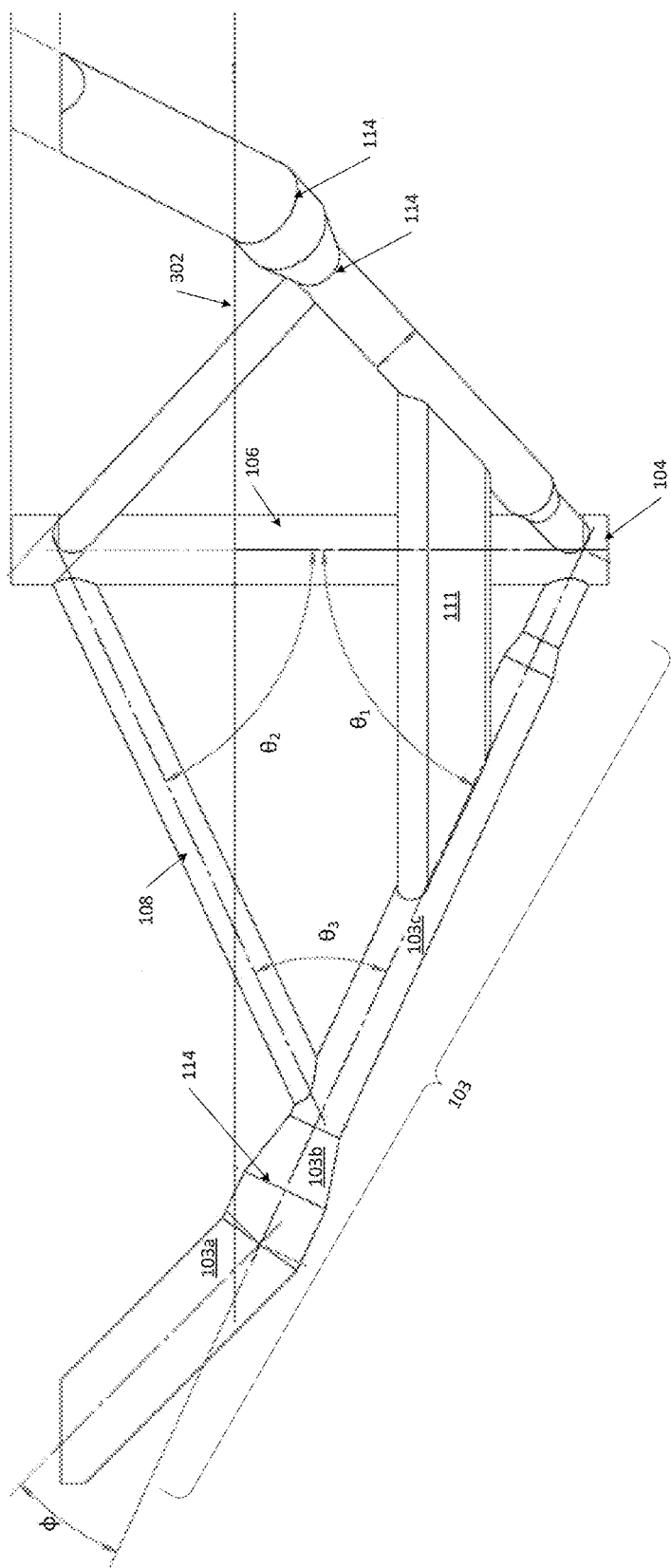
FIG. 9 is an enlarged elevation view of the support structure of FIG. 7 without the tower and turbine attached, according to the present disclosure.

FIG. 7 is a perspective view of an alternative exemplary floatable support structure 101 with a wind turbine 200 attached. The floatable support structure 101 can be attached to the sea floor as described above, by catenary anchor lines, vertical tendons or a combination thereof. FIG. 8 is front elevation view of the support structure with a tower and turbine attached of FIG. 7, according to the present disclosure. FIG. 9 is an enlarged elevation view of the support structure of FIG. 7 without the tower and turbine attached. In various aspects, the floatable support structure 101 as shown in FIGS. 7 and 8 can be considered to be in an operating or rest position, in that the wind turbine 200 can either be operating or still (at rest) when floating near the surface of water and extending upward from the surface of water in a vertical direction.

As in other embodiments, The tower 202 is supported by the support member 106. The tower 202 extends from the support member 106 to high above the water surface 302 to support the wind turbine 200. In more detail, the tower 202 supports the nacelle 204 which supports the turbine rotor blades 206, and which contains the controls, the generator, and other required components for operation of the wind turbine 200.

With further reference to FIGS. 7, 8, and 9, the floatable support structure 101 includes angled buoyant units 103 which meet at the keel 104 of the floatable support structure 101 and extend slopingly upward from the keel 104. The floatable support structure 101 also includes a generally central support member 106 which attaches to the angled buoyant units 103 at the keel 104 and extends generally vertically therefrom. The support member 106 is configured to attach to and to support a tower 202 of the turbine 200. The angled buoyant units 103 and the support member 106 are connected to one another by various braces 108 and connecting weighted braces referred to herein as "heave braces" 111. In contrast with buoyant units 102 considered above, the angled buoyant units 103 of the present embodiment include a bend in the shape of each angled buoyant units 103, providing for additional advantages as set forth below.

The angled buoyant units 103 are partly submerged in use, i.e. partly below the water surface 302, as shown. The illustrated embodiments include three such angled buoyant units 103, which slope outward from at or near the keel 104 to above the water surface 302. In some presently preferred embodiments, three or more angled buoyant units 103 are provided. Each angled buoyant units 103 is a generally tubular member whose diameter may vary along its length, as will be discussed in detail later. Each angled buoyant units 103 can intersect the support member 106 at an angle $\theta_1$ of approximately 25°-90°, or at any increment or gradient of angle range therein. In some contexts, angle $\theta_1$ can be referred to as a lift angle for the overall apparatus. In other words, the longitudinal direction of each angled buoyant units 103 is about 25°-90° from the longitudinal direction of the support member 106, which is vertical when the structure is in its upright position, i.e. not being rocked by waves or wind. In some preferred embodiments, each angled buoyant units 103 intersects the support member 106 at a lift angle $\theta_1$ of approximately 35°-65° from the longitudinal direction of the support member 106, while in other preferred embodiments, each angled buoyant units 103 intersects the support member 106 at a lift angle $\theta_1$ of approximately 45°-90° from the longitudinal direction of the support member 106. The individual construction of any given floatable support structure 101 and corresponding lift angle $\theta_1$ for any angled buoyant units 103 of such a floatable support structure 101 can be selected according to the known environment, wave and current conditions, sea or ocean characteristics, or sea floor geography of the intended deployment location of the floatable support structure 101 and wind turbine 200.

Complementing the lift angle $\theta_1$ between each angled buoyant unit 103 and the support member 106 are an angle $\theta_2$ between the support member 106 and each brace 108, as well as an angle $\theta_3$ between each angled buoyant unit 103 and each respective brace 108. The variation between each of lift angle $\theta_1$, angle $\theta_2$, and/or angle $\theta_3$ can be adjusted to optimize the center of gravity in any given floatable support structure 101 for deployment in particular locations.

In the embodiment illustrated in FIG. 9, each angled buoyant unit 103 can be a generally tubular member whose diameter varies along its length to provide a larger cross-sectional area at the top portion of the angled buoyant unit 103 than at the bottom. Further, in the embodiment illustrated in FIG. 9, each angled buoyant unit 103 includes distinct compartments, upper compartment 103a, intermediate compartment 103b (alternatively referred to as a middle or transition compartment), and lower compartment 103c along its length. The compartments 103a, 103b, and 103c can be separated by water-tight bulkheads 114. There may also be smaller sub-compartments within any one or all of these compartments 103a, 103b, 103c, such as is seen within intermediate compartment 103b, which can also further include a water-tight bulkhead 114 therein.

In some embodiments, the upper compartments 103a can contain buoyant material, and the lower compartments 103c can contain ballast material. The diameter and length of the upper compartment 103a of each buoyant unit can be selected to achieve the required buoyant force and water plane area and resulting moment of inertia of the floatable support structure 101 cross section at the waterline 302. The intermediate compartment 103*b* connects the upper compartment 103*a* of each angled buoyant unit 103 to the lower compartment 103*c* of the angled buoyant unit 103. In the embodiment illustrated in FIG. 9, the lower compartment 103*c* has a smaller cross-sectional area than the upper compartment 103*a*. Similarly, the diameter and length of the lower compartment 103*c* of each buoyant unit can also be selected to achieve the required moment of inertia of the floatable support structure 101. Depending on requirements for stability, a large portion of each angled buoyant unit 103 will be filled with ballast. Therefore ballast requirements as well as buoyancy requirements will dictate the length and cross-sectional area of each compartment 103*a*, 103*b*, and/or 103*c* of each angled buoyant unit 103.

In the embodiments as shown in FIGS. 7, 8, and 9, angled buoyant units 103 of the floatable support structure 101 include a bend upward that can be characterized as a bend angle $\phi$ between the longitudinal axis of lower compartment 103*c* and the longitudinal axis of upper compartment 103*a*, where the intermediate compartment 103*b* is positioned generally in line with the longitudinal axis of lower compartment 103*c* but providing a transition coupling between the two ends of the angled buoyant unit 103. In some embodiments, the bend angle $\phi$ can be between approximately 5°-90°, or at any increment or gradient of angle range therein. In some preferred embodiments, each angled buoyant unit 103 can have a bend angle $\phi$ of approximately 35°-65° from the longitudinal axis of upper compartment 103*a* relative to the longitudinal axis of lower compartment 103*c*, while in other preferred embodiments, each angled buoyant unit 103 can have a bend angle $\phi$ of approximately 45°-90°, and in other embodiments, each angled buoyant unit 103 can have a bend angle $\phi$ of approximately 15°-45°. In combination, each angled buoyant unit 103 upper compartment 103*a* can be angled to a degree that is the sum of lift angle $\theta_1$ and bend angle $\phi$, relative to the support member 106.

In one embodiment, both the angled buoyant units 103 and the support member 106 are steel tubular members, which may include ring stiffeners and/or longitudinal stiffeners on the interior to hold the round shape and to resist hydrostatic pressure. In another embodiment, the angled buoyant units 103 and support member 106 include ring stiffeners, and may additionally include longitudinal stiffeners.

The tower 202 is supported by the support member 106. The tower 202 extends from the support member 106 to high above the water surface 302 to support the wind turbine 200. In more detail, the tower 202 supports the nacelle 204 which supports the turbine rotor blades 206, and which contains the controls, the generator, and other required components. Generally, as seen in FIG. 8, the support member 106 and tower 202 define a vertical Z-axis of the floatable support structure 101 and wind turbine 200. The two angled buoyant units 103 positioned in front of the turbine rotor blades 206 can be seen breaking the water surface 302, and the span across these two angled buoyant units 103 can be defined as a Y-axis of the floatable support structure 101 and wind turbine 200.

The angled buoyant units 103 are connected to the support member 106 by braces 108. The angled buoyant units 103 are connected to one another by heave braces 111. Near the keel 104, the angled buoyant units 103 can be further connected to the support member 106 by directly inserting into the support member or via connecting members (not shown).

The heave braces 111 of the floatable support structure 101 can provide stability to the overall a floatable support structure 101, serving a similar function as the heave plate 150 considered in other embodiments, minimizing heave while the floatable support structure 101 is being towed to the installation site and/or after installation. Advantageously, heave braces 111 can provide additional mass to the floatable support structure 101 below the water surface 302 while also connecting angled buoyant units 103 to each other, and further allowing water to pass between the angled buoyant units 103, support member 106, and heave braces 111, such that the floatable support structure 101 is not adversely pushed or moved by waves or currents that may otherwise be incident on a solid heave plate. In other words, the application of heave braces 111 can allow for design and control of a center of gravity or moment of inertia of the floatable support structure 101 as needed along the height of the support member 106. In some aspects, the heave braces 111 can be angled relative to the support member 106 at a lift angle $\theta_1$ similar to angled buoyant units 103, thereby also aligning with the longitudinal axis of lower compartment 103*c*. In other aspects, the heave braces 111 can be oriented at an angle relative to the support member 106 different than the angled buoyant units 103, which may provide for alternative or functional current or water flow around the floatable support structure 101.

The floatable support structure 101, when deployed at an operational location, and when in an operational, generally level, or rest position, can be mounted or tethered to the sea floor by catenary anchor lines, which may include, for example, chain and/or wire rope, and/or polyester as described above. Floatable support structure 101, when deployed in a transport position as described below, will not be mounted, tethered, or anchored in the same manner.

FIG. 10A is side elevation view of the floatable support structure 101 with a tower 202 and wind turbine 200 of FIG. 7. In some aspects, the differentiation in structure between the tower 202 and the floatable support structure 101 (in this case, alternatively referred to as the hull) can be identified by the seam line 160. FIG. 10B is side view of the floatable support structure 101 with a tower 200 and wind turbine 200 of FIG. 7 in a tilted or transport position. As shown in FIG. 7, FIG. 8, and FIG. 10A, the overall floatable support structure 101 and wind turbine 200 can be arranged or oriented in an operating position, with the tower 202 effectively straight and vertical, or normal to the plane of the water surface 302, such that the turbine rotor blades 206 can rotate and generate electricity. Moreover, the floatable support structure 101 and wind turbine 200 structure can be moved or tilted from the operating position shown in FIG. 10A to the transport position shown in FIG. 10B. The amount or degree of tilt can be identified as tilt angle $\psi$, where the tilt angle $\psi$ can be further understood as the angle between the tower 202 in a vertical (normal to the water surface 302) position and the of the tower 202 when in the transport orientation (projecting upward and diagonally relative to the water surface 302). In the transport position, a tether, rope, cable, or other attachment can connect to the floatable support structure 101 to a ship or boat which can then tow the floatable support structure 101 through the water.

In particular, tilt angle $\psi$ can be approximately 5°-70°, or at any increment, sub-range, or gradient of angle range therein. In some embodiments, optionally dependent, for example, on the speed of transport, prevailing wind and/or wave conditions, or size of a towing craft, tilt angle $\psi$ can be between about 5°-10°, 10°-15°, 15°-20°, 20°-25°, 25°-

30°, 30°-35°, 35°-40°, 40°-45°, 45°-50°, 50°-55°, 55°-60°, 60°-65°, 65°-70°, or any increment, combination, or gradient of range therein. In some preferred embodiments, the tilt angle ψ can be at or about 35°±5°. The tilt angle ψ for any given floatable support structure 101 can be selected based upon the speed at which the floatable support structure 101 is to be towed, the height or length of the tower 202, the size and/or length of the turbine rotor blades 206, the weight of the wind turbine 200, or a combination thereof.

The heave braces 111 can provide a further advantage for movement of the overall floatable support structure 101 and wind turbine 200. The angle of the heave braces 111 as attached to the angled buoyant units 103 can be configured such that, when in the towing or transport position, the surface of the heave braces 111 directed toward the bottom of the floatable support structure 101 act similarly as the bow or prow of a ship, breaking and deflecting water as the floatable support structure 101 passes through water. Accordingly, the structure and configuration of the heave braces 111 make the transport of the floatable support structure 101 easier by reducing the amount of resistance and work necessary to tow the floatable support structure 101 through the water.

In the transport orientation, one of the angled buoyant units 103 is raised upward, generally above the water surface 302, while the other two angled buoyant units 103 are relatively more submerged below the water surface 302. The bend in the angled buoyant units 103, as defined by the lift angle φ, minimizes the depth underneath the water that the angled buoyant units 103 extend. Rather, the majority of these angled buoyant units 103 are positioned, at most, at about the same depth as the keel 104 of the floatable support structure 101. Moreover, these angled buoyant units 103 are partially positioned behind the heave braces 111 when the is being towed floatable support structure 101, thereby following in the wake of the heave braces 111. Accordingly, the amount of drag generated by the angled buoyant units 103 is relatively mitigated and minimized.

FIG. 11A is a plan view of the support structure as shown in FIG. 9. In particular, the heave braces 111 are shown connecting the angled buoyant units 103 to each other, where the angled buoyant units 103 are separated as spokes extending from the support member 106, 120° away from each other. The shape of the heave braces 111 is exemplary and is in no way intended to be limiting.

FIG. 11B is a cross-sectional view of the support structure as shown in FIG. 11A along the line A-A, and FIG. 11C is a detail view of a section of the support structure as shown in FIG. 11B as region B. FIG. 11B further shows the connection of support member 106 and angled buoyant units 103 by braces 108. FIG. 11C further shows the length along angled buoyant units 103 where heave braces 111 connect to angled buoyant units 103. In further detail, interior space 113 is shown within angled buoyant units 103, which can optionally be a hollow space or a space filled with a buoyant material. While embodiments illustrated herein show three angled buoyant units 103, which are be symmetrically disposed around the support member 106, it can be understood that four or more angled buoyant units 103 can be disposed around the support member 106, and that such angled buoyant units 103 can be arranged in either a symmetric or asymmetric configuration.

Figure 12C:
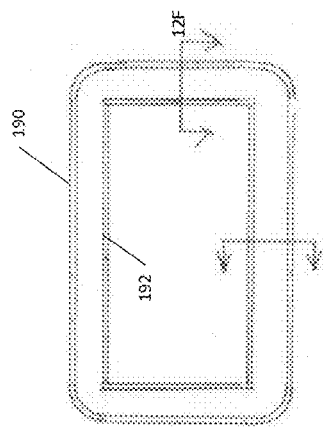
FIGS. 12A-12E are cross-sectional shapes that can be alternatively used for the structure of buoyant units, according to the present disclosure.
Figure 12B:
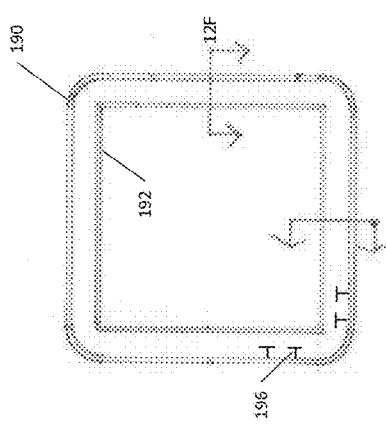
Figure 12A:
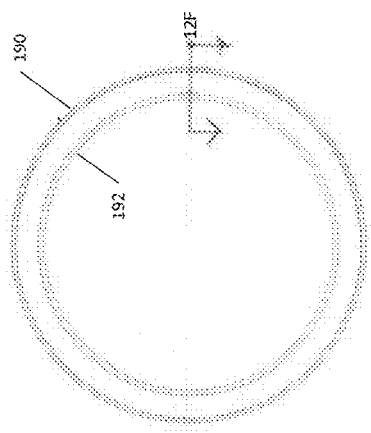
Figure 12D:
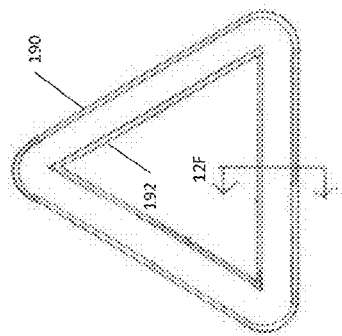
Figure 12E:
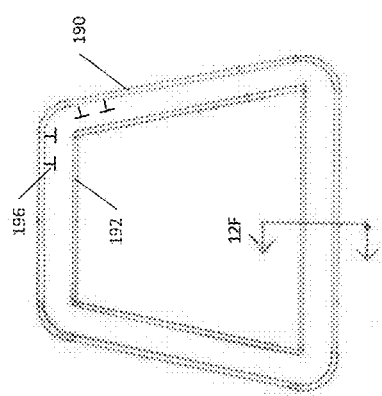

FIGS. 12A-12E are cross-sectional shapes that can be alternatively used for the structure of buoyant units 102 and/or angled buoyant units 103. Each of FIGS. 12A-12E shows a shell structure 190 and a transverse stiffener structure 192 defining the exterior and interior, respectively, of such buoyant units. In various aspects, the transverse stiffener structure 192 can be a tee stiffener, a type stiffener, a flange, or the like. In sequence, FIG. 12A shows a circular buoyant unit cross-section, FIG. 12B shows a square buoyant unit cross-section, FIG. 12C shows a rectangular buoyant unit cross-section, FIG. 12D shows a triangular buoyant unit cross-section, and FIG. 12E shows a trapezoidal buoyant unit cross-section. The cross-sectional shapes considered herein can, where appropriate, have rounded or soft corners, such that manufacture (e.g. rolling) of such buoyant units can be more readily accomplished than buoyant units with sharp corners. Each of the buoyant unit cross-sections further includes a view along cross-sectional line 12F cutting across both the shell 190 and the transverse stiffener structure 192. In some aspects, the interior space within the buoyant units can be hollow or filled with a buoyant material, and the shape of a buoyant unit allows for more or less space for such application.

In various embodiments, any given floatable support structure can have buoyant units 102 and/or angled buoyant units 103 that have the same cross-sectional shape or more than one cross-sectional shape. In other embodiments, any given buoyant unit 102 and/or angled buoyant unit 103 can have a cross-sectional shape that changes from one shape to another along the length of the buoyant unit 102 and/or angled buoyant unit 103.

Figure 12F:
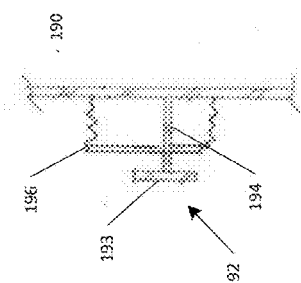
FIG. 12F is a cross-sectional detail view of the buoyant unit walls as shown in FIGS. 12A-12E, according to aspects of the present disclosure.

FIG. 12F is a cross-sectional detail view of the buoyant unit walls as shown in FIGS. 12A-12E, all drawn along the line 12F in those figures, and further showing longitudinal stiffeners 196 for the sake of description. The shell 190 and the transverse stiffener 192 are both shown as the exterior and interior, respectively, forming the overall structure of a buoyant unit. Additionally shown is a flange 193 and a web 194, where the web 194 extends between and connects the shell 190 and the flange 193. In some embodiments, the flange 193 and the web 194 can be understood to form the transverse stiffener 192. In some aspects, the web 194 can fill a portion or substantively all of the space between the shell 190 and the stiffener 192, providing for additional buoyant material and/or structural support for the buoyant unit. FIG. 12F further shows a longitudinal stiffener 196 between a portion of the transverse stiffener 192 and the shell 190. The longitudinal stiffener 196 can be used to run between transverse stiffener structures 192, adding strength to the overall buoyant unit 102 and/or angled buoyant unit 103 structures. The longitudinal stiffeners 196 can have tee, plate, or angled shapes, crossing-over or overlapping with web 194 structures. In other embodiments, the longitudinal stiffeners 196 can be single-edge members running along the length of either (or both of) shell 190 or flange 193. Specific implementations of longitudinal stiffeners 196 can be seen in regions of FIG. 12B and FIG. 12E, though it is understood that longitudinal stiffeners 196 can be used in all variations of buoyant unit cross-sections and can be present throughout the perimeter of any given buoyant unit cross-section. In some embodiments, longitudinal stiffeners are not necessarily needed at any region of the buoyant unit cross-section.

Another feature of some of the above-described exemplary embodiments is that the very large cost of offshore construction can mostly be avoided. Except for the preset anchors and their attachment to the floatable structure, the fabrication, assembly, launching and outfitting of the complete wind turbine structure can be accomplished at or near the quay. This will, however, require reasonably deep water at the quay and no overhead obstructions that would interfere with towing to the installation site. This feature is aided by the sloping buoyant units and the fact that they intersect the water surface with a large elliptical waterplane area at a large distance from the centerline of the structure. A requirement for stability for a floating body is that the body's metacenter be above the center of gravity of the body. The metacentric height (i.e. the distance between the center of gravity and the metacenter) is equal to the moment of inertia of the waterplane area divided by the volume of displaced water plus or minus the distance between the centers of buoyancy and gravity when the body is in equilibrium. The configuration of the embodiments described herein, with a large separation between each buoyant unit's waterplane area, results in a high metacenter and good stability both when free floating while being towed and also when anchored.

The combination of small motions (due to the structure having a natural period that is not synchronous with wave periods), reduced vortex induced motions, and good stability due to a high metacenter, results in a safe and stable floating structure. The fact that most offshore construction can be avoided results in an economical installation.

As will be understood by those skilled in the art, the present invention may be embodied in other specific forms without departing from the essential characteristics thereof. Many other embodiments are possible without departing from the essential characteristics thereof. Many other embodiments are possible without deviating from the spirit and scope of the invention. These other embodiments are intended to be included within the scope of the present invention, which is set forth in the following claims.

What is claimed is:

1. An apparatus for supporting an additional structure near a surface of a body of water,
    wherein the apparatus is configured to assume a rest position and orientation when the apparatus is floating at the surface and when the body of water is substantially still, wherein the rest orientation defines a vertical direction extending from the surface to a keel at a lowermost position of the apparatus,
    the apparatus comprising:
        a support member configured to be attached to the additional structure; and
        a plurality of buoyant units configured to be partially submerged, wherein each buoyant unit is attached to the support member at or near the keel and extends from the keel in a generally longitudinal direction of the buoyant unit, wherein each of the buoyant units comprises a first cross-sectional area at a first position along the longitudinal direction, and a second, different cross-sectional area at a second position along the longitudinal direction, and wherein the longitudinal direction of each buoyant unit defines an angle of approximately 35°-65° with respect to the vertical direction.

2. The apparatus of claim 1, wherein each of the buoyant units comprises a first cross-sectional area at a first portion of the buoyant unit disposed distal from the keel, and a second, smaller cross-sectional area at a second portion of the buoyant unit disposed proximal to the keel.

3. The apparatus of claim 2, wherein each of the buoyant units further comprises a transitional portion of the buoyant unit disposed between the first portion and the second portion.

4. The apparatus of claim 3, wherein a cross-section at the transitional portion is tapered.

5. The apparatus of claim 1, wherein each of the buoyant units comprises a cross-sectional area that is substantially constant along the longitudinal direction.

6. The apparatus of claim 1, wherein the buoyant units are symmetrically disposed around the vertical direction.

7. The apparatus of claim 1, wherein the plurality of buoyant units comprises three buoyant units.

8. The apparatus of claim 1, wherein the plurality of buoyant units comprises at least four buoyant units.

9. The apparatus of claim 1, wherein at least a portion of each buoyant unit that is distal from the keel comprises a buoyant material, wherein a density of the buoyant material is lower than a density of the body of water.

10. The apparatus of claim 1, wherein at least a portion of each buoyant unit that is proximal to the keel comprises a ballast material, wherein a density of the ballast material is equal to or higher than a density of the body of water.

11. The apparatus of claim 1, further comprising at least one anchor line or tether, configured to attach the apparatus to a substantially stationary position within the body of water.

12. The apparatus of claim 11, wherein the anchor line or tether comprises one or more catenary anchor lines, wherein each of the catenary anchor lines is attached to one of the buoyant units.

13. The apparatus of claim 11, wherein the anchor line or tether comprises one or more tendons, wherein each of the tendons is attached to one of the buoyant units, wherein each of the tendons is configured to assume a substantially vertical orientation to anchor the apparatus to a floor of the body of water.

14. The apparatus of claim 1, further comprising a heave plate disposed at the keel.

15. A floatable system, comprising:
    a floatable structure; and
    an apparatus for supporting the floatable structure near a surface of a body of water,
    wherein the system is configured to assume a rest position and orientation when the system is floating at the surface and when the body of water is substantially still, wherein the rest orientation defines a vertical direction extending from the surface to a keel at a lowermost position of the apparatus,
    the apparatus comprising:
        a support member, wherein the support member is attached to an additional structure; and
        a plurality of buoyant units configured to be partially submerged, wherein each buoyant unit is attached to the support member at or near the keel and extends from the keel in a generally longitudinal direction of the buoyant unit, wherein each of the buoyant units comprises a first cross-sectional area at a first portion of the buoyant unit disposed distal from the keel, and a second, smaller cross-sectional area at a second portion of the buoyant unit disposed proximal to the keel, and wherein the longitudinal direction of each buoyant unit defines an angle of approximately 35°-65° with respect to the vertical direction.

16. The system of claim 15, wherein each of the buoyant units comprises a first cross-sectional area at a first position along the longitudinal direction, and a second, different cross-sectional area at a second position along the longitudinal direction.

17. The system of claim 15, wherein each of the buoyant units further comprises a transitional portion of the buoyant unit disposed between the first portion and the second portion.

18. The system of claim 17, wherein a cross-section at the transitional portion is tapered.

19. The system of claim 15, wherein each of the buoyant units comprises a cross-sectional area that is substantially constant along the longitudinal direction.

20. The system of claim 15, wherein the buoyant units are symmetrically disposed around the vertical direction.

21. The system of claim 15, wherein the plurality of buoyant units comprises three buoyant units.

22. The system of claim 15, wherein the plurality of buoyant units comprises at least four buoyant units.

23. The system of claim 15, wherein at least a portion of each buoyant unit that is distal from the keel comprises a buoyant material, wherein a density of the buoyant material is lower than a density of the body of water.

24. The system of claim 15, wherein at least a portion of each buoyant unit that is proximal to the keel comprises a ballast material, wherein a density of the ballast material is equal to or higher than a density of the body of water.

25. The system of claim 15, further comprising at least one anchor line or tether, configured to attach the apparatus to a substantially stationary position within the body of water.

26. The system of claim 25, wherein the anchor line or tether comprises one or more catenary anchor lines, wherein each of the catenary anchor lines is attached to one of the buoyant units.

27. The system of claim 25, wherein the anchor line or tether comprises one or more tendons, wherein each of the tendons is attached to one of the buoyant units, wherein each of the tendons is configured to assume a substantially vertical orientation to anchor the system to a floor of the body of water.

28. The system of claim 15, wherein the floatable structure comprises a wind turbine and associated tower.

29. The system of claim 28, wherein the support member is attached to the tower.

30. The system of claim 15, further comprising a heave plate disposed at the keel.

31. A support system for supporting a structure adjacent to a surface of a body of water, comprising:

a support member defining a resting axis;

a plurality of buoyant units attached to the support member at or near a keel of the support system for enhancing buoyancy thereof and for reducing vortex induced vibration, wherein each of the buoyant units is at least partially filled with buoyant material such that each of the buoyant units has a net buoyancy which helps support the structure, wherein each of the buoyant units comprises a first cross-sectional area at a first position along the longitudinal direction, and a second, different cross-sectional area at a second position along the longitudinal direction, wherein each of the buoyant units comprises a first cross-sectional area at a first portion of the buoyant unit disposed distal from the keel, and a second, smaller cross-sectional area at a second portion of the buoyant unit disposed proximal to the keel, and wherein each of the buoyant units defines a longitudinal direction, and wherein the longitudinal direction of each buoyant unit defines an angle of approximately 35°-65° with respect to the resting axis of the support member.

32. The support system of claim 31, wherein the longitudinal direction of each buoyant unit is not parallel to the longitudinal direction of any of the other buoyant units.

* * * * *